US009487054B2

(12) United States Patent
McIntyre et al.

(10) Patent No.: US 9,487,054 B2
(45) Date of Patent: Nov. 8, 2016

(54) INTEGRATION SYSTEMS, METHODS AND DEVICES FOR TIRE PRESSURE MONITORING SENSORS (71) Applicant: Continental Automotive Systems, Inc., Auburn Hills, MI (US)

(72) Inventors: Matthew D McIntyre, New Baltimore, MI (US); Jean-Christophe Deniau, Fenton, MI (US); Brian J. Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/942,108

(22) Filed: Jul. 15, 2013

(65) Prior Publication Data
US 2015/0015387 A1  Jan. 15, 2015

(51) Int. Cl.
*B60C 23/00* (2006.01)
*B60C 23/04* (2006.01)

(52) U.S. Cl.
CPC ....... *B60C 23/0471* (2013.01); *B60C 23/0472* (2013.01); *B60C 23/0479* (2013.01)

(58) Field of Classification Search
None
See application file for complete search history.

(56) References Cited

U.S. PATENT DOCUMENTS

| 2005/0132792 | A1 | 6/2005 | Lemense et al. | |
| 2006/0081697 | A1 | 4/2006 | Brinton et al. | |
| 2006/0203783 | A1* | 9/2006 | Gahler | B60T 8/885 370/338 |
| 2010/0066524 | A1 | 3/2010 | Yu | |
| 2012/0050029 | A1 | 3/2012 | Yu et al. | |
| 2012/0166836 | A1* | 6/2012 | Hardman | B60C 23/0433 713/320 |
| 2012/0218096 | A1 | 8/2012 | Yu et al. | |
| 2013/0106596 | A1* | 5/2013 | Mouchet | 340/445 |

FOREIGN PATENT DOCUMENTS

WO 2012140367 A2 10/2012
WO 2013063061 A1 5/2013

OTHER PUBLICATIONS

International Search Report for the application PCT/US2014/046491 dated Sep. 24, 2014.

* cited by examiner

Primary Examiner — Ojiako Nwugo (57) ABSTRACT

The present invention relates to systems, methods and devices for the integration of tire pressure monitoring sensors to a tire pressure monitoring system of a vehicle. In one aspect, the present invention provides a method of integrating a tire pressure monitoring sensor with a tire pressure monitoring system of a vehicle. The method includes the step of selecting with a computer a program software for a tire pressure monitoring sensor of a tire pressure monitoring system of a vehicle. The method further includes transmitting the selected program software from the computer to a configuration tool for a tire pressure monitoring sensor. The method further includes utilizing the selected program software to integrate the tire pressure monitoring sensor with the tire pressure monitoring system of the vehicle.

25 Claims, 7 Drawing Sheets

INTEGRATION SYSTEMS, METHODS AND DEVICES FOR TIRE PRESSURE MONITORING SENSORS

TECHNICAL FIELD

The present invention relates to systems, methods and devices for the integration of tire pressure monitoring sensors to a tire pressure monitoring system of a vehicle.

BACKGROUND

Commercial and non-commercial vehicles now have tire pressure monitoring systems (TPMS) which include a central module, integrated or in communication with an electronic control unit of the vehicle, and tire pressure monitoring sensors (TPM sensors) for each vehicle wheel unit. In general, the TPM sensors monitor tire pressure within a respective tire and transmits a wireless signal to the central module which is indicative of tire pressure. Should the sensed pressure be outside of an acceptable range or a substantial change in tire pressure occur, an alarm is generated and transmitted to the user of the vehicle.

Over time, TPM sensors require replacement by service technicians due to damage, depleted battery or otherwise. This requires installation and integration of new TPM sensors with a TPMS of a vehicle. During this process, in one configuration, the technician places the vehicle in a learning mode, according to original equipment manufacturers (OEM) procedures, requiring each TPM sensor to be triggered for identification purposes. Placement of the TPMS 14 into a learning mode is achieved through the performance of one or more steps, such as cycling an ignition key, pressing remote buttons, depressing a brake pedal, utilizing door lock switches, utilizing headlight switches, combinations thereof, or otherwise. The technician then sequentially triggers each sensor of a wheel unit, utilizing a TPMS tool, causing each sensor, new and existing, to transmit a wireless signal to a control module of the TPMS. These tools communicate with a TPM sensor through low frequency signals which communicates with the TPMS through higher radio frequency signals. The control module records an identifier, which may comprise numbers, letters, a combinations of numbers and letters or any other identifying indicator, of each signal so as to interpret the location of the TPM sensor data during operation thereof.

More recently, certain manufacturers offer TPM sensors that can be configured, through flash programming or program selection, by a service technician with suitable operating software for a particular make, model and year of a vehicle. Unfortunately, this requires the purchase and maintenance of expensive tools, such as the TECH400SD, sold by Bartec USA at www.bartecusa.com, or otherwise. The purchase and maintenance of TPM sensor configuration tools can be considerable as service stations should maintain one configuration tool for a certain amount of vehicles anticipated to be serviced. Accordingly, the greater number of anticipated clientele, the more configuration tools must be on hand and maintained. Furthermore, the substantial cost of configuration tools effectively eliminates individuals from servicing their own TPMS.

In another aspect, with the continual expansion of the TPMS market, due to increasing number of vehicles being sold with TPMS, TPM sensor tools must be continually updated to include not only new TPMS models introduced every year, but also improved software for existing TPM sensors. Accordingly, existing configuration tools must have new memory modules purchased and installed to include the new TPMS data. Alternatively, each configuration tool must be connected to a computer in order to download program software updates, via the internet, or otherwise. In either instance, time must be dedicated for the accessing and installation of updated program software onto configuration tools.

SUMMARY

The present approaches provide improved systems, methods and devices for the integration of tire pressure monitoring (TPM) sensors with a tire pressure monitoring system (TPMS) of a vehicle. More specifically, in one aspect, the present invention provides a TPM sensor integration system including a central station configured for access by one or more TPMS tools to provide real-time access of current TPM sensor program software. In another aspect, the present approaches provide simplified and cost effective TPM tools for communication with TPM sensors. Other aspects should become apparent as shown and described herein.

Using the present approaches, it is possible to reduce or eliminate downtime required for updating TPM sensor program software, communication configuration, or otherwise, for use by TPM tools. Further, the cost and maintenance of TPM tools is reduced through the elimination of required software updates. Still further, the cost and maintenance of TPM tools is reduced through the reduction in complexity of the tools, e.g. processing, memory or otherwise, by utilizing a central station for storing and initiating software commands to be utilized by TPM tools. Other advantageous features should become apparent as shown and described herein.

In view of the foregoing, in a first aspect, a method of integrating a tire pressure monitoring sensor with a tire pressure monitoring system of a vehicle is provided. The method includes the step of selecting with a computer a program software for a tire pressure monitoring sensor of a tire pressure monitoring system of a vehicle. The method further includes transmitting the selected program software from the computer to a configuration tool for a tire pressure monitoring sensor. The method further includes utilizing the selected program software to integrate the tire pressure monitoring sensor with the tire pressure monitoring system of the vehicle.

In another aspect, a system for integrating a tire pressure monitoring sensor with a tire pressure monitoring system of a vehicle is provided. The system includes a configuration tool adapted to communicate with a tire pressure monitoring sensor that is useable with a tire pressure monitoring system of a vehicle. The system further includes a computer having access to a program software for a tire pressure monitoring sensor. The system further includes a communication link formed between the configuration tool and the computer, wherein the computer is configured to transmit the program software to the configuration tool through the communication link.

In another aspect, a hand-held configuration tool adapted to communicate with a tire pressure monitoring sensor of a tire pressure monitoring system of a vehicle is provided. The tool includes a low frequency transmitter and receiver suitable for communication with a tire pressure monitoring sensor. The tool further includes a radio frequency receiver suitable for receiving data over a Wi-Fi network. The tool further includes a memory device configured to store information received by the radio frequency receiver.

In another aspect, a computer-readable memory device storing computer program instructions is provided, which when executed by a computer comprising at least one processor results in: i) generating a user interface for selection of a program software for a tire pressure monitoring sensor; and ii) transmission over a Wi-Fi network the selected program software to a configuration tool for a tire pressure monitoring sensor.

In another aspect, a tire pressure monitoring sensor is provided. The sensor includes a pressure sensor configured for monitoring air pressure and generating signals indicative thereof. The sensor further includes a receiver configured for communication with a computer. The sensor further includes a processing unit and memory device including software for storing configuration or program software, transmitted by the computer and received by the receiver, onto a memory device of the tire pressure sensor.

These and other features can be best understood from the following specification and drawings, the following of which is a brief description.

DETAILED DESCRIPTION

Figure 1:
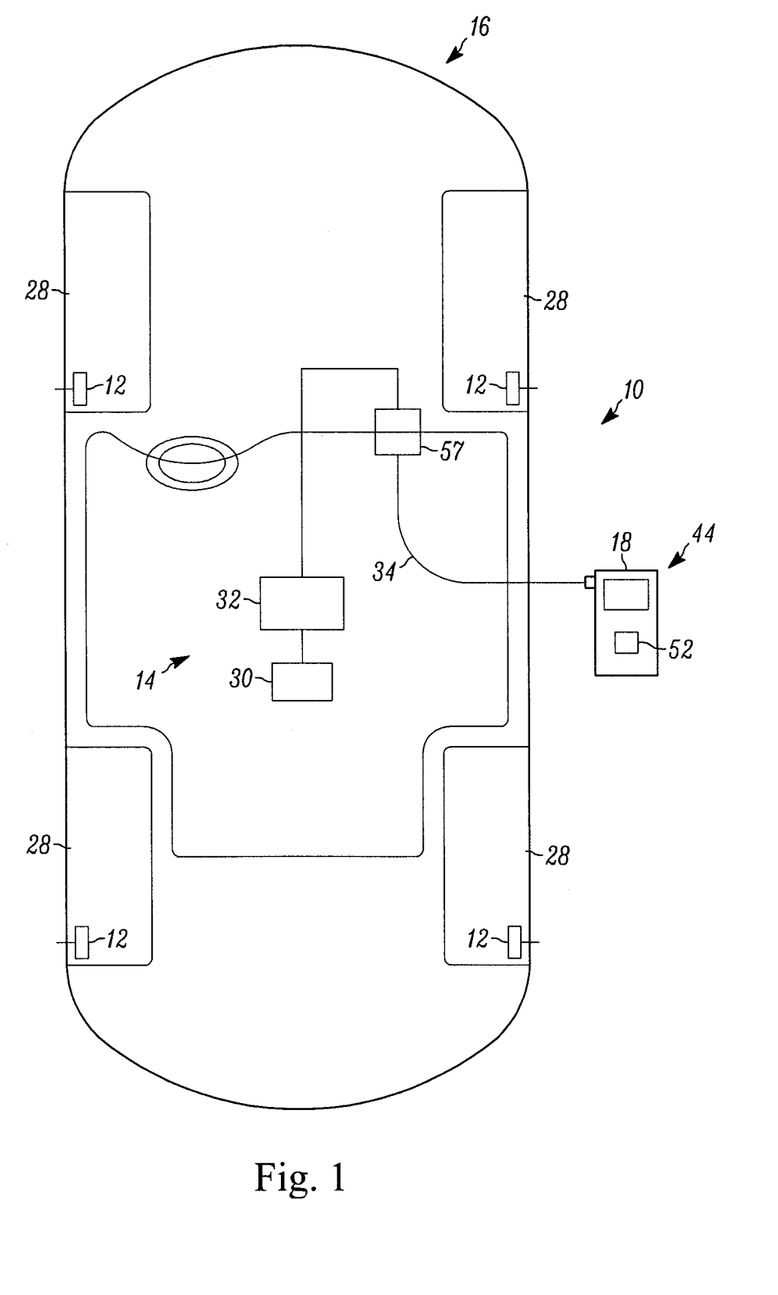
FIG. 1 illustrates a schematic view of an exemplary integration system for a tire pressure monitoring sensor according to various embodiments of the present invention.
Figure 2:
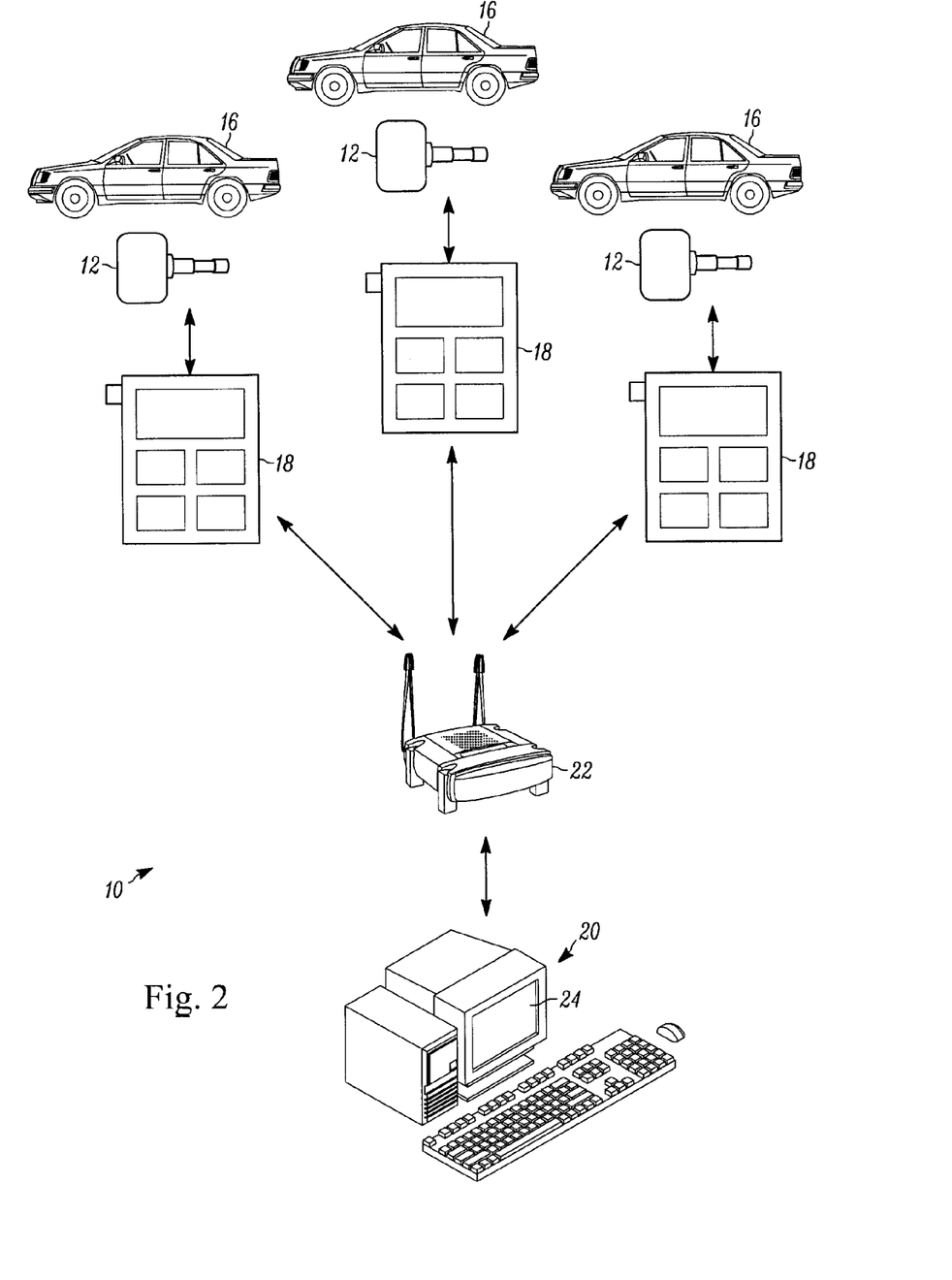
FIG. 2 illustrates a schematic view of another exemplary integration system for a tire pressure monitoring sensor according to various embodiments of the present invention.

Referring to FIGS. 1 and 2, an exemplary integration system 10 for integration of a tire pressure monitoring (TPM) sensor 12 with a tire pressure monitoring system (TPMS) 14 of a vehicle 16 is shown. The integration system 10 includes a configuration tool 18 configured for communication with a TPM sensor 12 and in several particular configurations programming or configuring of a TPM sensor 12 with suitable program software for communication and/or operation with a TPMS 14 of a vehicle 16. The configuration tool 18 is in communication with a computer 20 through a wireless hub 22. The computer 20 includes a user interface 24 for selection of a suitable program software (e.g. operating instructions, communication protocol, or otherwise) for a TPM sensor and/or configuration tool. The computer 20 is further configured for transmission of the selected suitable program software to a configuration tool 18, through the wireless hub 22. In one example, the computer 20 includes or is in communication with a database of program software 26.

The program software utilized by the integrations system 10 may comprise different forms depending upon the TPM sensor 12, TPMS 14 or both. For example, with TPM sensors 12 configured for flash programming through wired or wireless means, the program software includes communication protocols, operation instructions or both for the TPM sensor. With TPM sensors already programmed but requiring instructions on which communication protocol and/or operating instruction to be utilized, the program software provides such instructions. With TPM sensors already permanently programmed and configured for a particular make, model and/or year of manufacture, or particular TPMS, the program software is utilized by the configuration tool 18 for communication with the TPM sensor. It should also be appreciated that the configuration tool 18 may also utilize the program instruction in the first two examples for communication with the TPM sensor.

As an overview, in one general description of an exemplary method, a user of the of the integration system 10 identifies a particular vehicle in which one or more TPM sensors 12 are to be installed and integrated with a TPMS 14 of the vehicle. The user then utilizes the computer 20 to select the program software to be utilized by a new or replacement TPM sensor 12 for the identified vehicle. The user then selects the suitable program software and initiates the transfer of information pertaining to the program software to a configuration tool 18, via wireless hub 22. The transferred selected suitable program information is received by the configuration tool. With the configuration tool, the user then instructs the TPM sensor 12, through the configuration tool 18, to operate according to the selected suitable program information. This may include installation of the suitable program software onto a memory device of the TPM sensor 12, instructions to the TPM sensor 12 to operate according to a particular suitable program software (e.g. operation according to a particular operating instruction, communication protocol, or otherwise), instructions to the TPMS sensor to communicate with the TPMS 14 of the vehicle 16, or otherwise cause integration of the TPM sensor with the vehicle, either before or after installation onto a wheel unit 28 of the vehicle 16. It should be appreciated that that the configuration tool 18 may be utilized to instruct a plurality of TPMS sensors 12, either sequentially or all at once. Further, in one example, the configuration tool 18 itself may be programmed through the computer 20 and wireless hub 22 to communicate or operate in a suitable manner, e.g. frequency or otherwise, for communication with a TPM sensor 12. Still further, in another example, the configuration tool is in communication with a control module 30 of the TPMS 14 or an electronic control unit 32 of the vehicle 16 for downloading or uploading information pertaining to existing or newly installed TPM sensor, such as an identifier or otherwise.

In greater detail, the program software may include a single piece of code or multiple pieces of code. Such software or pieces of code can include communication protocols such as transmission frequency, data format or otherwise. Such software or pieces of code can alternatively include operation instructions for function of the TPM sensor. Still further, the software or pieces of code can include a combination of communication protocols and operation instruction, or otherwise.

In one example, the operating instructions includes a single software program (or routine) or multiple software programs (or routines or subroutines) for causing the sensor to operate, which may be according to original manufacturers specification for a TPM sensor or a tire pressure monitoring system. For example, it is contemplated that the one or more software programs causes: i) tire pressure to be measured, ii) temperature of air within a tire to be measured, iii) tire pressure data to be calibrated based upon temperature, iv) a signal to be generated and transmitted according to original manufacturers specification, v) analysis of signals received by a receiver of the TPM sensor, vi) generation of a response signal to a signal received by a receiver of the TPM sensor, vii) formation of communication protocols (such as data structure, computer instructions or otherwise, viii) combinations thereof, or ix) otherwise. In one example, once the TPM sensor is programmed with the program software the program software becomes permanently, or semi-permanently, embedded within a memory device of the TPM sensor to prevent change or substantial change of the program software.

In one example, the protocol comprises data structure of signals being generated and analyzed by the TPM sensor. The protocol can be implemented by program software received by or existing within a memory device the TPM sensor. The protocol may be automatically implemented when received by the TPM sensor, the protocol may include instruction for implementation, or otherwise. By example, the protocol may include one or more of: i) data structure, ii) computer instructions, iii) transmission frequency, iv) data frames per transmission, v) time periods between transmission, or vi) otherwise. In one particular example, the transmission received by the TPM sensor includes an indication that the signal comprises a protocol signal and includes communication protocol for the TPM sensor to operate, includes the data structure of signals to be generated including placement of wakeup signals, pressure data, temperature data, and/or otherwise. The signal also indicates frequency of transmission and number of frames to be transmitted per transmission, wherein each frame includes wakeup signal, pressure data, temperature data and/or otherwise. The protocol signal also indicates time periods between transmission. It should be appreciated that other communication protocols and configurations can be included.

The program software can vary based upon the vehicle make, model and/or year of manufacture. Alternatively, the program software can be configured for multiple applications, e.g. multiple vehicle makes, models and/or years of manufacture. As such, programming of the TPM sensor can include transfer of multiple communication protocols and/or operation instructions for multiple tire pressure monitoring systems. Also, programming or configuration of the TPM sensor can include selection of communication protocols and/or operation instruction from a database located with the TPM sensor.

Figure 3:
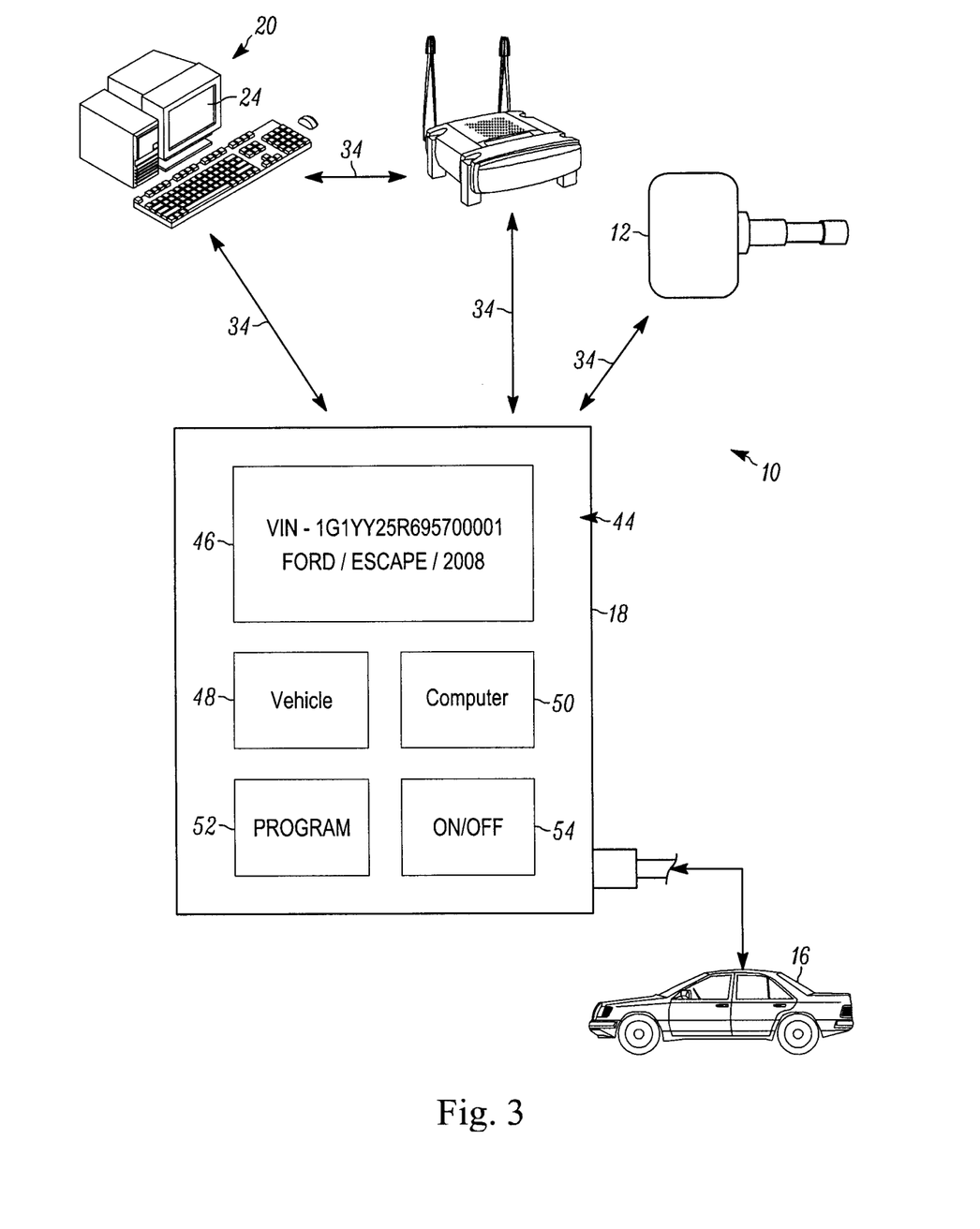
FIG. 3 illustrates a top view of an exemplary configuration tool for a tire pressure monitoring sensor according to various embodiments of the present invention.
Figure 4:
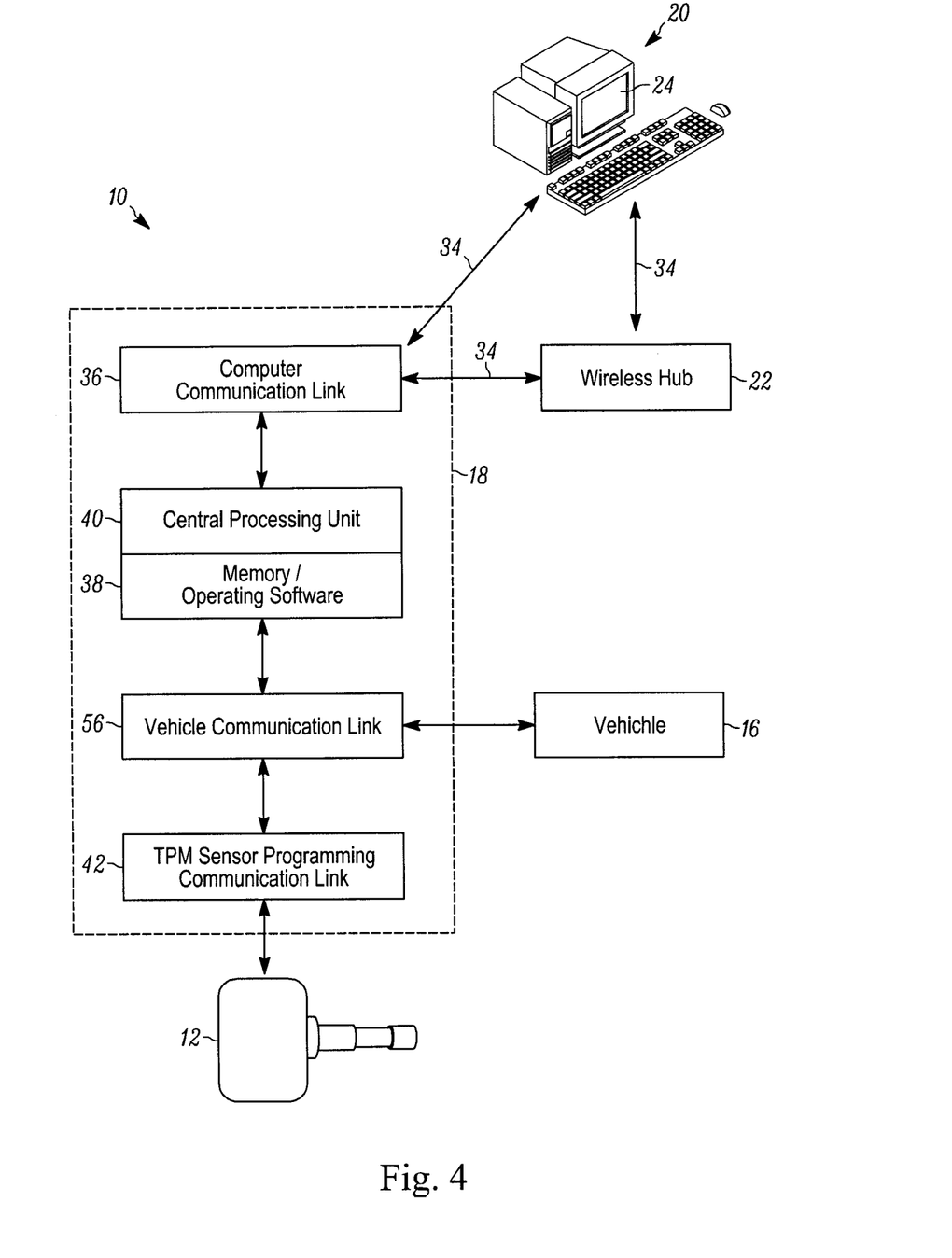
FIG. 4 illustrates a schematic view of an exemplary configuration tool for a tire pressure monitoring sensor according to various embodiments of the present invention.

In greater detail, referring to FIGS. 3 and 4, several examples of configuration tools 18 of the present invention are shown. It should be appreciated that the configuration tool 18 is capable of integrating a TPM sensor 12 with a TPMS 14 of a vehicle 16 including configuring the sensor to operate and/or communicate in a particular manner, programming the TPM sensor with software program to function in a compatible manner, e.g. communication, operation or otherwise, for a particular TPMS. Hence, program software transferred to the configuration tool 18 from the computer 20 may be instructions on how the TPM sensor 12, configuration tool 18 or both will communicate and function, or actual software program code to be used by the TPM sensor, configuration tool or both. Accordingly, the configuration tool 18 is configured for receiving information from the computer 20, directly or through a wireless hub 22. The configuration tool 18 is further configured to communicate some or all of the information from the computer 20 to one or more TPM sensors 12. Such information may comprise program software including communication protocols, operating instructions, both communication protocols and operating instructions, or otherwise. It is also contemplated that information transmitted to the TPM sensor 12 by the configuration tool 18 may include other information used for integration of the TPM sensor 12 with the TPMS 14 of the vehicle 16 such as an identifier, wheel unit placement, encryption or otherwise.

The configuration tool 18 is in communication with the computer 20 through a physical or wireless connection 34. In one example, the configuration tool 18 includes a computer communication link for forming a wireless communication link with the computer 20. In one particular example, the computer communication link includes a wireless transmitter and receiver, which communicates directly with the computer 20 or through a wireless hub 22. Alternatively, or in conjunction with the first wireless transmitter and receiver, in one example it is contemplated that the computer communication link 36 includes a physical connector for connection to the computer 20 or intermediate connection hub. Such physical connector my comprise a universal serial bus (USB) or otherwise.

With respect to the wireless transmitter and receiver of the computer communication link 36, in one example the configuration tool 18 communicates with the computer through a wireless Wi-Fi communication link through transmission and reception of radio waves. In this configuration, in one example each configuration tool 18 of the integration system 10 communicates over a single Wi-Fi frequency. However, in another example, each configuration tool 18 communicates on a different frequency, which may be preset or may be manually set for each configuration tool. It should be appreciated that other wireless communication configurations are possible. In either configuration, in several examples, the range of the Wi-Fi communication link is suitable for use in a vehicle service shop, or otherwise, and is in the range of about 10 to 200 feet.

In one particular example, communication between the configuration tool 18 and computer 20 is encrypted through suitable encryption hardware and/or software. Advantageously, this can prevent confusion between the configuration tools 18 or prevent unwanted electrical devices from receiving or acting upon the communication. Accordingly, it would be possible to include a plurality of configuration tools on the same integration system, but each configuration tool would include a different encryption for ensuring that information transmitted by the computer 20 is only utilized by a desired configuration tool. It should be appreciated that in this configuration, each configuration tool 18 would have suitable software, hardware or both for selectively receiving and utilizing encrypted information from the computer 20.

In one example, the configuration tool 18 includes a computer-readable memory device 38 for storing operation instructions for the configuration tool, TPM sensor program software, vehicle information, or otherwise. In one example, the configuration tool 18 further includes a central processing unit 40 for generating communication with the computer 20, wireless hub 22, vehicle, TPM sensor 12 or otherwise. The central processing unit 40 further executes operating instructions for the configuration tool 18 for communication with the various devices, generation and/or interaction with a user interface 42 of the configuration tool, interaction with the user interface 24 of the computer or otherwise.

The configuration tool 18 further includes a TPM sensor programming communication link 42 for communication with one or more TPM sensors 12. In one example, the TPM sensor programming communication link 42 includes a wireless transmitter and receiver for transferring data or identification information, programming the TPM sensor, configuration of the TPM sensor, or otherwise. In this configuration, the wireless transmitter and receiver operate over a low frequency range, such as 125 kHz, and has reception distance of several inches to several feet. Accordingly, it is possible to program a single sensor or multiple sensors, whether the sensor is hand-held or installed on the wheel unit 28 of the vehicle 16.

In one example, the configuration tool 18 further includes a user interface 44 for facilitating communication with the computer 20, TPM sensor 12, TPMS 14, vehicle 16 or otherwise. In one configuration, referring to FIG. 3, the user interface 44 comprises display screen 46 and buttons 48, 50, 52 and 54. However, the user interface 44 may also include a keyboard either connected, integrated or generated on the display screen 46. It is further contemplated that operation commands may be automatically initiated, such as when the programming tool 16 is connected to another electrical device, as described herein or otherwise. Exemplary commands include, without limitation: i) vehicle button 48 for initiating communication, downloading information, uploading information, and/or otherwise, with a vehicle 16; ii) computer button 50 for initiating communication, downloading information, uploading information, and/or otherwise, with the computer 20; iii) program button 52 for initiating communication, downloading information, uploading information, and/or otherwise, with the TPM sensor 12; and iv) on/off button 54 for simply turning the configuration tool on or off. Other buttons and user interface components are possible.

Referring to FIGS. 1 and 4, in one example, the configuration tool 18 further includes a vehicle communication link 56 for forming a physical or wireless connection 34 for facilitating communication with the vehicle 16, such as with the control module 30 of the TPMS 14, electronic control unit 32 of the vehicle 16 or otherwise. In one configuration, the vehicle communication link 56 includes a wireless transmitter and receiver for corresponding to a transmitter and receiver of the vehicle 16. In another configuration, the vehicle communication link 56 includes an on-board diagnostic connector 57. In these configurations, it is possible to download and upload TPM sensor information, such as TPM sensor identification information, or other information.

Figure 5:
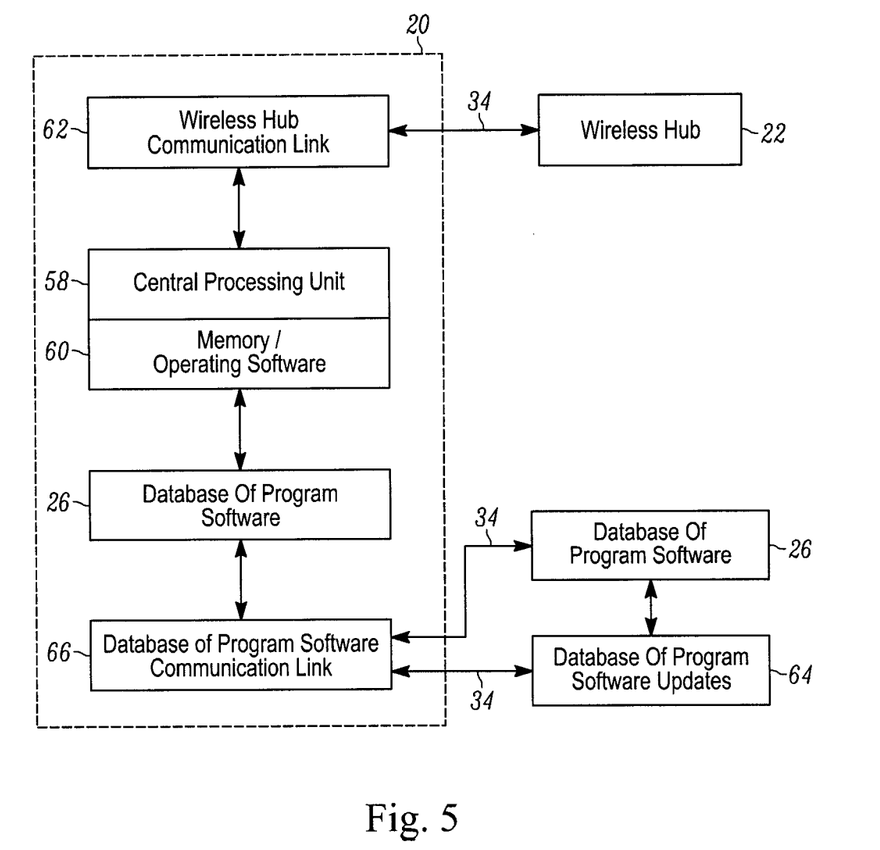
FIG. 5 illustrates a schematic view of an exemplary computer for identification and selection of a program software for a tire pressure monitoring sensor according to various embodiments of the present invention.

Referring to FIG. 5, an example of a computer 20 of the present invention is shown. In this configuration, the computer 20 includes a central processing unit 58 and computer-readable memory device 60 for performing common function associated with computers and achieving method steps and functions according to various aspects of the present invention. The central processing unit 58 further executes operating instructions for the computer 20 for communication with the various devices, generation and/or interaction with the user interface 24 of the computer, interaction with the user interface 44 of the configuration tool or otherwise.

The computer 20 further includes a wireless hub communication link 62 for forming a physical or wireless connection 34 with the wireless hub 22. In one example, the wireless hub communication link 62 includes a physical connector commonly used for data transfer between electrical components and more particularly wireless routers or hubs, such as an RJ-45 WAN port.

The computer 20 further includes a user interface 24, for generating a display for the input of vehicle information, display and selection of suitable program software, downloading of selected suitable program software to the configuration tool 18, initiating programming or communication between the configuration tool and TPM sensor, or otherwise to facilitate in the methods and features as described herein.

In one example, the integration system 10 further includes a database of program software 26 for installation on a memory device of a TPM sensor 12. The database of program software 26 includes a plurality of program software for different makes and models of vehicles 16 and TPMS. In several configurations, the program software is searchable or selectable based upon vehicle identification numbers (VIN), vehicle make model and year of manufacture, or otherwise. The database of program software is continually updated, from the database of program software updates 64 or otherwise, to include the most resent version and listing of TPM sensor program software. In one configuration, the database of program software 26 is updated automatically through software of the computer 20, in another configuration, the database of program software is updated manually.

In one example, the database of program software 26 is stored on a memory device of the computer, such as computer-readable memory device 60 or otherwise. In another example, the database of program software 26 is stored on a memory device remote from the computer 20. In this latter configuration, the computer 20 is in communication with the database of program software 26 through a database of program software communication link 66, which forms a physical or wireless connection 36 with the database of program software 26.

Figure 6:
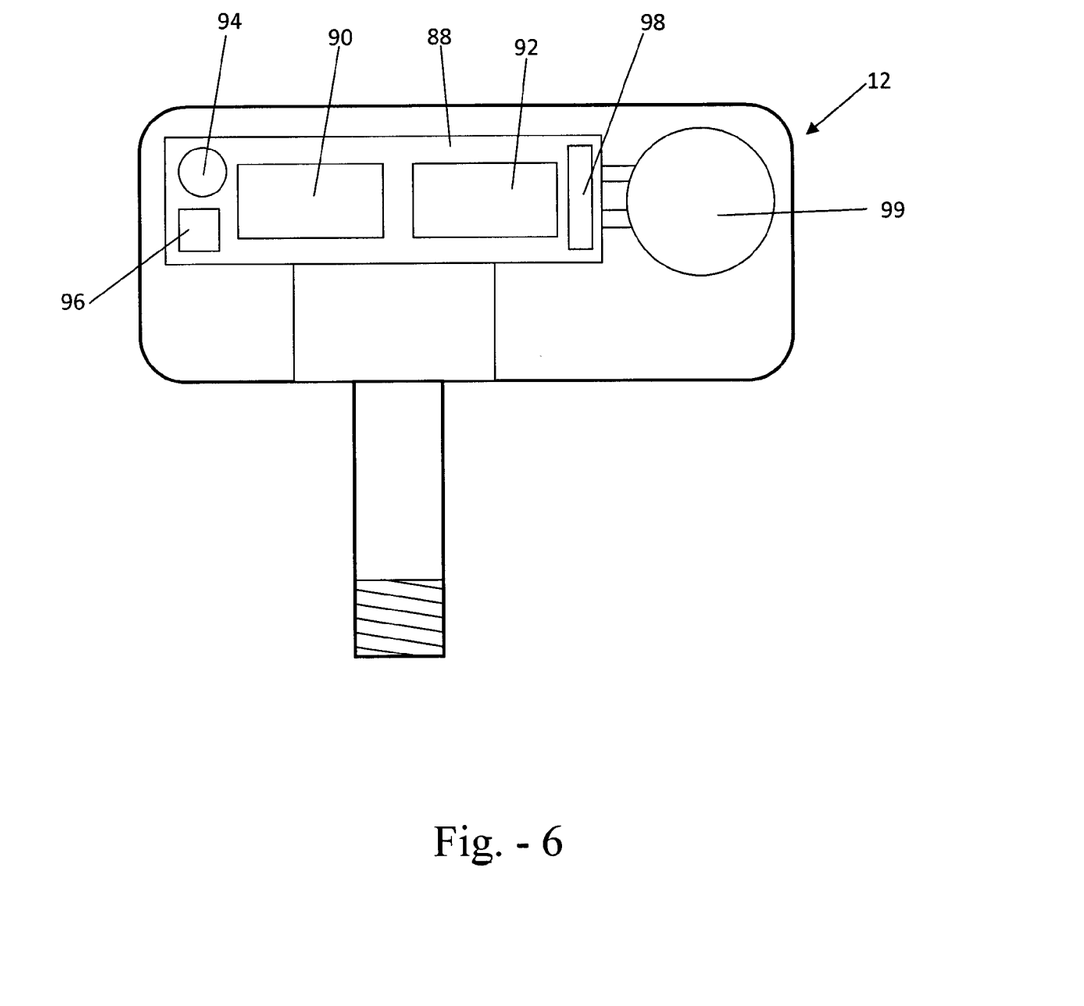
FIG. 6 illustrates a top view of a tire pressure monitoring sensor including an integrated circuit according to various embodiments of the present invention.

Referring to FIG. 6, an exemplary TPM sensor 12 is shown. The sensor includes an integrated circuit board 88 including a processing unit 90, one or more computer-readable memory device 92, pressure sensor 94, receiver 96 and wireless transmitter 98. The TPM sensor 12 further includes a suitable power supply, such as battery 99, for providing power to various components of the integrated circuit board 88 including processing unit 90, wireless transmitter 98 or otherwise. The pressure sensor 94 of the TPM sensor 12 generates raw data indicative of air pressure within the associated tire. The raw data is transmitted to the processing unit 90 and stored on the computer-readable memory device 92 of the TPM sensor 12. In one example, the memory device 92 further stores the unique identifier for the TPM sensor 12.

The receiver 96 is configured for receiving wireless signals from the computer 20, either directly, through the configuration tool 18 or both. The signals received by the receiver 96 are transmitted to the processor 90 where it is evaluated in part through suitable software stored on the computer-readable memory device 92. Should the signal be interpreted as a request for a transmission of the unique identifier then the processor 90 transmits the identifier through the transmitter 98, which may be transmitted to the vehicle, configuration tool, computer or combinations thereof. Examples of signals that can be interpreted as a request for a transmission of an identifier include signals having a particular frequency, code or both. Such signals may include signals commonly transmitted by a configuration tool for causing triggering of a TPM sensor or a signal including instructions for transmission of the unique identifier, or otherwise. Similarly, response signals initiated by the processor 90 and software stored on the computer-readable memory device 92 may include a signal including data commonly transmitted by the TPM sensor (e.g. tire pressure data, transmission formats, temperature, identifier or otherwise), alternatively the response signal may solely, or substantially solely, include the unique identifier, or alternatively the response signal may include a combination of the unique identifier and data commonly transmitted by the TPM sensor. Other configurations are possible.

In one example, the wireless transmitter 98 transmits low frequency signals such as low frequency signals in the range of about 30 to 300 kHz. In one example, transmitter 98 transmits high frequency signals such as signals commonly transmitted by TPM sensors 12 such as signals greater than about 300 MHz or in the range of about 300 MHz to 3 GHz, such as between about 315 to 433 MHz and in certain particular configurations around 315 MHz, around 433 MHz or higher.

Figure 7:
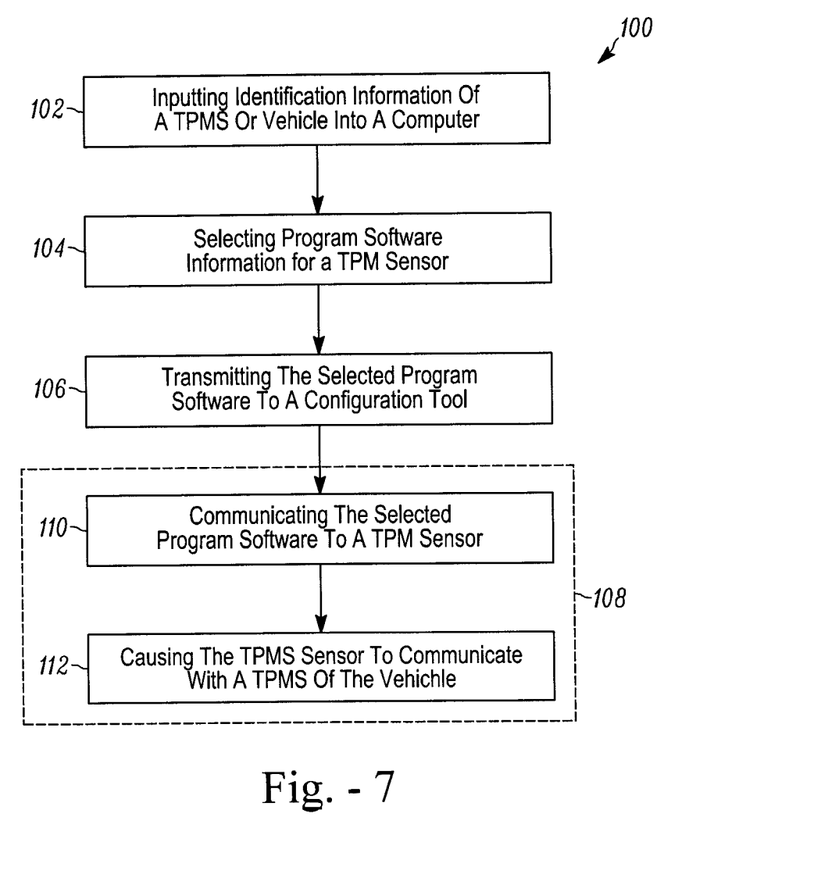
FIG. 7 illustrates a flow chart illustrating an exemplary method of integrating a tire pressure monitoring sensor with a tire pressure monitoring system according to various embodiments of the present invention.

Referring to FIG. 7, methods 100 of integrating a TPM sensor 12 with a TPMS 14 of a vehicle 16 are provided. In one example, the method includes the step of inputting identification information of a TPMS or Vehicle into a Computer 102. The identification information of the TPMS can be obtain through identification of a VIN of the vehicle 16, identification of a make, model and/or manufacture year of the vehicle, image capturing or otherwise. The information is inputted into the computer 20 utilizing the user interface 24. A search is then performed for a suitable TPM sensor program software for a corresponding TPMS 14 of the identified vehicle. Alternatively, the user interface 24 provides a listing of all available vehicles, TPMS and/or TPM sensor program software. In one example, the TPM sensor program software is integrated into a database of program software 26, which is included or accessible by the computer 20.

The method further includes the step of selecting program software information for a TPM sensor 104. In one example, this is performed through the user interface 24. However, in another example the program software is automatically select after a search of program software based upon identification information of the vehicle 16.

The method further includes the sep of transmitting the selected program software to a configuration tool 106. In one example, the computer generates a physical or wireless connection 34 with a configuration tool 18, as further indicated by the user. In one particular example, the physical or wireless connection 34 comprises a wireless connection formed between the computer 20 and configuration tool 18, and even more particularly between a wireless hub 22 and the configuration tool through a Wi-Fi communication link.

The program software received by the by configuration tool 18 is recorded and stored, albeit temporarily, in a memory device, such as computer-readable memory device 38 or otherwise. Alternatively, it is possible that the configuration tool already stores the program software, such as in an embodiment where the database of program software is stored on a memory device of the configuration tool 18, that the computer indicates which program software is to be utilized by the configuration tool 18. In one example, information pertaining to the program software, such as vehicle and/or software identification information is displayed on a display screen 46 of a user interface 44. Advantageously, this allows a user to confirm that the correct TPM sensor program software is received.

The method further includes the step of integrating the tire pressure monitoring sensor with a tire pressure monitoring system 108. For example, in one configuration the method includes the step of communicating the selected program software to a TPM sensor 110. This may includes transfer of communication protocols or operating instructions to the TPM sensor or transfer of instructions to the TPM sensor based upon the program software. Such instructions may include which program software to be utilized or instructions to the TPM sensor to communicate with a TPMS of a vehicle. As previously described, it should be appreciated that the program software may comprise or include communication and/or operating instruction to be programmed, such as flash programmed or otherwise, onto a memory device of the TPM sensor 12. It should also be appreciated that the program software may comprise instruction on which operating instructions, communication protocols or both, stored on the TPM sensor, that is to be utilized by the TPM sensor. It should also be appreciated that the program software may comprise communication information to be utilized by the configuration tool 18 for communication with the TPM sensor. It should also be appreciated that a combination of these three features may be included with the program software.

The method further includes causing the TPM sensor to communicate with a TPMS of a vehicle 112. Communication of the TPM sensor 12 with the TPMS 14 of a vehicle 16 provides and indication to the TPMS the location and identification of the TPM sensor.

It should be appreciated the more or less steps may be included with methods as shown and described herein. For example, in one example, the method further includes forming a communication link between the configuration tool 18 and vehicle 16 to download or upload identification information of a TPM sensor, data recorded by a TPM sensor or otherwise.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of integrating a tire pressure monitoring sensor (12) with a tire pressure monitoring system (14) of a vehicle (16), comprising the steps of:
   at a computer that is physically separate from a configuration tool, selecting a vehicle-type by a user;
   storing the vehicle type in a memory at the computer;
   searching a database using the vehicle type to obtain one or more software modules that are suitable for the vehicle type;
   at the computer, displaying identities of the one or more software modules, each of the one or more software modules being used in one or more tire pressure monitoring systems and operable with a one or more vehicle-types;
   selecting by a user with the computer (20) and from the one or more software modules a program software for a tire pressure monitoring sensor (12) of a tire pressure monitoring system (14) of a vehicle (16), the selected program software corresponding to and suitable for the vehicle-type of the vehicle;

transmitting the selected program software from the computer (20) to the configuration tool (18) for the tire pressure monitoring sensor (12); and utilizing the selected program software to integrate the tire pressure monitoring sensor (12) with the tire pressure monitoring system (14) of the vehicle (16).

2. The method of claim 1, wherein the program software comprises communication protocol for the tire pressure monitoring sensor (12).

3. The method of claim 1, wherein the program software comprises operating instructions for the tire pressure monitoring sensor (12).

4. The method of claim 1, further comprising the step of programming the tire pressure monitoring sensor (12) with the program software.

5. The method of claim 4, wherein the program software includes operation instructions and communication protocol for the tire pressure monitoring sensor (12).

6. The method of claim 1, further comprising the step of accessing the database (26) of program software for selection of the program software, the database (26) of program software being stored on a memory device of the computer.

7. The method of claim 6, further comprising the step of updating the database (26) of program software with additional program software, replacement program software or both.

8. The method of claim 1, further comprising the step of causing the tire pressure monitoring sensor (12) to transmit an identifier to the configuration tool (18).

9. The method of claim 8, further comprising the step of transmitting the identifier to the vehicle (16).

10. The method of claim 1, further comprising the step of generating a wireless communication link for transmission of the selected program software to the configuration tool (18).

11. A tire pressure monitoring sensor (12) for a wheel unit (28) programmed according to the method of claim 1.

12. A system for integrating a tire pressure monitoring sensor with a tire pressure monitoring system of a vehicle, comprising:

a configuration tool (18) adapted to communicate with a tire pressure monitoring sensor (12) that is useable with a tire pressure monitoring system (14) of a vehicle (16);

a computer (20) that is physically separate from the configuration tool, the computer having access to a program software for a tire pressure monitoring sensor (12), the computer configured to receive user input indicating a vehicle type, search a database using the vehicle type to obtain one or more software modules that are suitable for the vehicle type, display identities of the one or more software modules, each of the one or more software modules being used in one or more tire pressure monitoring systems, the computer configured to receive a selection by a user of a program software from the one or more software modules, the selected program software corresponding to and suitable for the vehicle-type of the vehicle that has previously been selected by the user at the computer and stored at the computer; and a communication link formed between the configuration tool (18) and the computer (20), wherein the computer (20) is configured to transmit the program software to the configuration tool (18) through the communication link.

13. The system of claim 12, wherein the database includes the program software (26).

14. The system of claim 13, wherein the database is stored on a memory device of the computer (20).

15. The system of claim 13, wherein the database is stored on a memory device remote from the computer (20).

16. The system of claim 12, wherein the program software includes communication protocol, software instructions for operation of the tire pressure monitoring sensor (12), or both.

17. The system of claim 12, wherein the communication link comprises a wireless link.

18. The system of claim 12, further comprising a wireless hub (22) communicatively disposed between the computer (20) and configuration tool (18).

19. The system of claim 12, further comprising a plurality of configuration tools (18), each configuration tool (18) being in communication with the computer (20) through a communication link.

20. The system of claim 19, wherein the plurality of configuration tools (18) are in communication with the computer (20) through a wireless network.

21. The system of claim 20, wherein the computer (20) is in selective communication with one of the plurality of configuration tools (18).

22. The system of claim 12, further comprising an on-board diagnostic connector (57) for communication between the configuration tool (18) and the vehicle (16).

23. The system of claim 12, wherein the configuration tool (18) includes a first low frequency transmitter and receiver, and a second transmitter and receiver.

24. The system of claim 12, wherein the computer (20) includes a user interface (24) for inputting identification information of the vehicle (16), selection of the program software, transfer of the program software to the configuration tool (18), or combinations thereof.

25. The system of claim 12, wherein the configuration tool (18) includes a user interface (44) for initiating communication with the vehicle (16), initiating communication with the computer (20), programming of the tire pressure monitoring sensor (12) with the selected program software, or combinations thereof.

* * * * *